W. J. SMITH.
MICROMETER GAGE.
APPLICATION FILED AUG. 3, 1912.

1,217,850.

Patented Feb. 27, 1917.
2 SHEETS—SHEET 1.

WITNESSES

INVENTOR
WILLIAM JOHN SMITH
By Howson and Howson
his Attorneys

W. J. SMITH.
MICROMETER GAGE.
APPLICATION FILED AUG. 3, 1912.

1,217,850.

Patented Feb. 27, 1917.
2 SHEETS—SHEET 2.

WITNESSES
L. H. Grote
W. E. Keis

INVENTOR
WILLIAM JOHN SMITH
By Howson and Howson
his Attn

UNITED STATES PATENT OFFICE.

WILLIAM JOHN SMITH, OF NEW HAVEN, CONNECTICUT.

MICROMETER-GAGE.

1,217,850.  Specification of Letters Patent.  Patented Feb. 27, 1917.

Application filed August 3, 1912. Serial No. 713,101.

*To all whom it may concern:*

Be it known that I, WILLIAM JOHN SMITH, a citizen of the United States, residing at 1435 Chapel street, in the city and county of New Haven and State of Connecticut, United States of America, have invented new and useful Improvements in Micrometer-Gages, of which the following is a specification.

My invention has for its object to provide micrometer gages by which very accurate indications are obtained and the indications are very readily ascertained.

According to my invention the indicating parts of the gage consist of rotatable disks, or dials, marked with indications denoting respectively any desired units (say tenths of inches) and divisions of such units (say hundredths and thousandths), these disks, or dials, being operated through suitable pinions by a rack upon a bar such as has been proposed for, or used in, some gages and is moved longitudinally by, or against, the object to be measured as distinguished from a screwing movement, the operation of the said bar causing the indicating disks, or dials, to be operated so as to give the required indication of measurement with great accuracy and so that it is easily read. The operative parts are returned to their normal position by means of a spring.

I will describe, with reference to the accompanying drawings, constructions of gages provided with disks, or dials, in accordance with my invention, but I do not limit myself to the precise details of construction illustrated.

Figure 1:
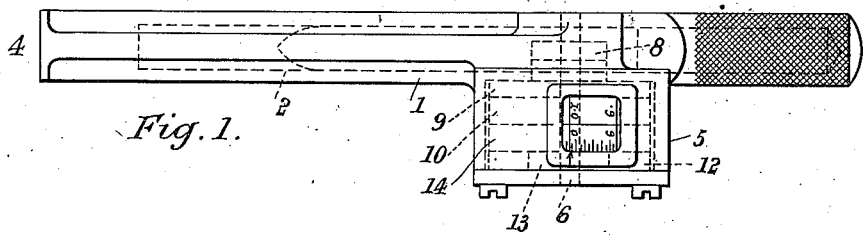
Figure 2:
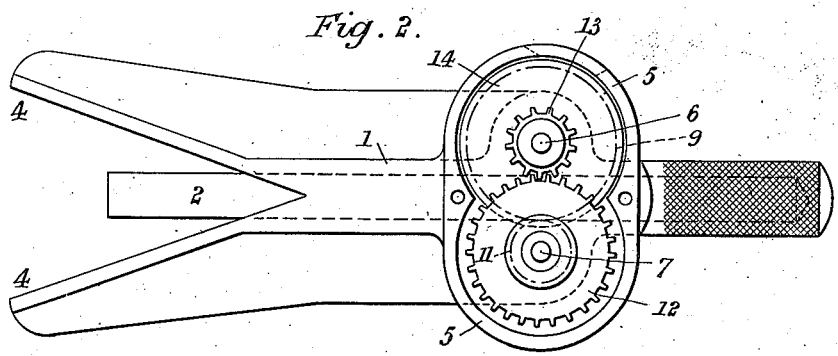
Figure 3:
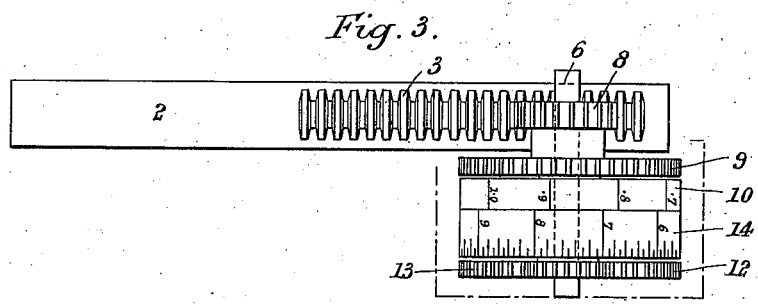
Figure 4:
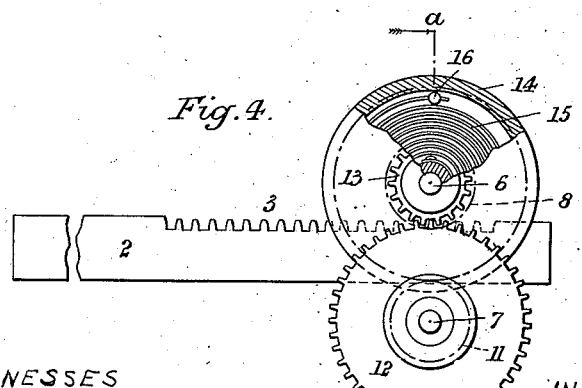
Figure 5:
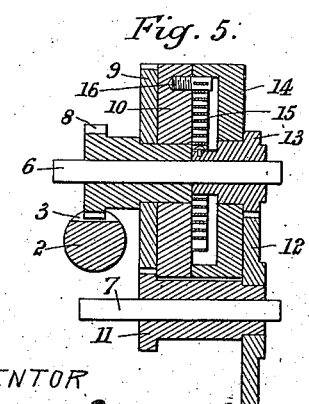
Figure 6:
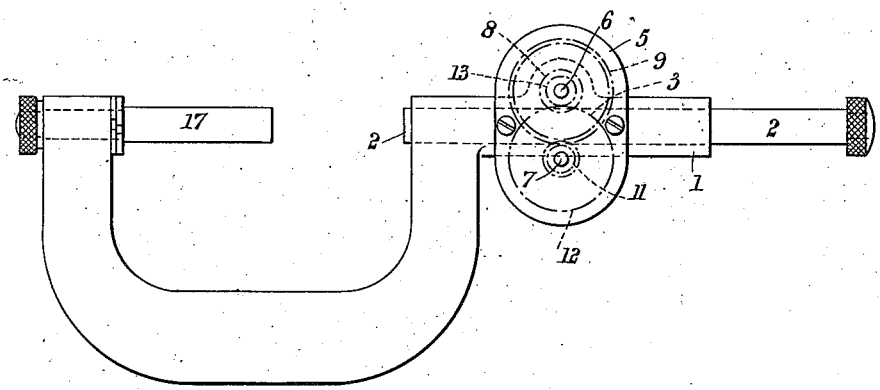
Figure 7:
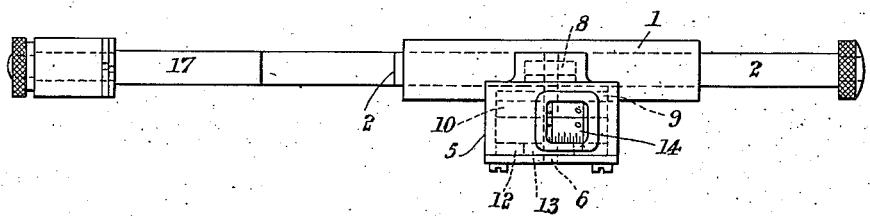
Figure 8:
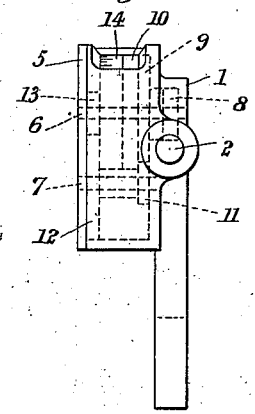

Figure 1 is a plan of one construction of gage, Fig. 2 is a side elevation with the cover removed, Fig. 3 is a plan, Fig. 4 a side elevation, and Fig. 5 a section (on the line *a, a* Fig. 4) of the operating mechanism of the disks, or dials, Figs. 3, 4 and 5 being drawn to a larger scale than Figs. 1 and 2. Figs. 6, 7 and 8 are respectively a side, plan and end view of the device applied to the common form of micrometer gage.

1 is a casing, bored to truly receive the longitudinally slidable bar 2, which is formed with a rack 3. The casing 1 is of a known kind provided with fixed jaws 4. The opposite end of the casing 1 may be knurled so as to be more easily handled. 5 is a casing fixed to, or formed in one with, the casing 1, within which casing 5, is situated the indicating mechanism operated by the rack 3. Spindles 6 and 7 are supported by the casing 5. On the spindle 6 is carried the pinion 8 (Fig. 3) on the boss of which are secured a toothed wheel 9, and a tenths disk 10. The wheel 9 drives a pinion 11 which is mounted on the spindle 7 the boss of the said pinion carrying at its opposite end a toothed wheel 12, which engages a pinion 13, loose on the spindle 6. Secured to the boss of the pinion 13 is a hundredths disk 14, the subdivisions of which give the reading in thousandths of an inch. The inner face of this disk 14 is recessed so as to form an annular space within which is a coiled spring 15 one end of which is fixed to a pin 16 carried by the tenths disk 10, the other end of the said spring being fixed to the boss of the pinion 13.

When the object to be measured is introduced between the jaws 4 and pressed inward till it bears against them, the bar 2 is moved inward and the rack 3, through the gearing described operates the two indicating disks, the gearing and the indications on the disks being so related to the angular space between the jaws 4 that when the object is arrested by the jaws 4 the true indication of the diameter of the object is given by the indications which come in line with a pointer, or mark, on the casing 5, and are seen through the opening provided for the purpose in the said casing.

Figs. 6, 7 and 8 are respectively a side elevation, plan, and end view of the same arrangement of indicating disks, or dials, and operating mechanism applied to an instrument also of a known kind with a fixed jaw 17, between which and the end of the bar 2 the object to be measured is placed; the bar 2 being pressed inward by simple longitudinal movement to come into contact with the side of the object opposite to that which bears against the fixed jaw 17.

The parts which correspond with those shown in Figs. 1 to 5 are marked with the same reference numerals and require no further description.

What I claim is:—

1. In a manually operated gage, a measuring bar longitudinally displaceable, a rack on said bar, a pinion gearing with said rack, a plurality of indicator dials arranged on a common axis and interconnecting gearing between said pinion and dials, said gearing and pinion having their axes arranged on opposite sides of the measuring bar, together with a spring tending to return said bar and dials to normal position after displacement.

2. In a manually operated micrometer gage, a measuring bar longitudinally displaceable, a rack on said bar, a pinion gearing with said rack, a plurality of indicator dials arranged on a common axis and operatively connected to said pinion, together with a coil spring on said axis and operatively connected between one of the dials at one end and to an element in the operative connection between the bar and dials at the other end and serving to return the bar and dials to normal position after displacement.

3. In a manually operated micrometer gage, a measuring bar longitudinally displaceable, a rack on said bar, a pinion gearing with said rack, a plurality of operatively connected indicator dials juxtaposed on a common axis but formed with a recess between their adjacent faces to afford a chamber for an operating spring, together with a coil spring within said chamber operatively connected to said parts in order to return said bar and dials to normal position after displacement.

In testimony whereof I have signed my name to this specification in the presence of two subscribing witnesses.

WILLIAM JOHN SMITH.

Witnesses:
GILBERT FLETCHER BYSON,
EDWARD GEORGE DAVIES.